United States Patent [19]
Pope

[11] Patent Number: 4,743,162
[45] Date of Patent: May 10, 1988

[54] FLUID TRANSFER SEAL FOR TRANSFERRING FLUID ACROSS A ROTATING BOUNDARY

[75] Inventor: Adam N. Pope, Cincinnati, Ohio

[73] Assignee: General Electric Company, Cincinnati, Ohio

[21] Appl. No.: 83,884

[22] Filed: Aug. 10, 1987

Related U.S. Application Data

[63] Continuation-in-part of Ser. No. 836,001, Mar. 4, 1986, abandoned.

[51] Int. Cl.$^4$ ............................................. F04D 29/08
[52] U.S. Cl. ............................ 415/170 R; 416/146 A; 277/96; 277/215
[58] Field of Search .......... 415/170 R, 170 B, 170 A; 416/146 A, 158; 277/96.1, 96, 215

[56] References Cited

U.S. PATENT DOCUMENTS

| | | | |
|---|---|---|---|
| 3,186,723 | 6/1975 | Wagner | 277/215 |
| 3,195,902 | 7/1965 | Tisch | 277/215 |
| 3,462,159 | 8/1969 | Baumann | 277/27 |
| 3,663,119 | 5/1972 | Brooking | 416/157 |
| 3,743,303 | 7/1973 | Pope | 277/27 |
| 3,743,435 | 7/1973 | Sproule et al. | 415/170 A |
| 4,199,152 | 4/1980 | Catterfeld | 277/3 |
| 4,289,264 | 9/1981 | Rawlins | 277/27 |
| 4,639,000 | 1/1987 | Warner | 277/41 |

OTHER PUBLICATIONS

Drawing No. SSCY4748, Stein Seal Company, Phila. Pa. 19132, "High Pressure Rotary Joint Washington Iron Works".

*Primary Examiner*—Robert E. Garrett
*Assistant Examiner*—John T. Kwon
*Attorney, Agent, or Firm*—Derek P. Lawrence

[57] ABSTRACT

A fluid transfer seal for transferring hydraulic fluid between differentially rotatable components, such as between the stator and rotor of a gas turbine engine. A circumferential channel is formed about the stator with a fluid passageway connecting the channel to a fluid supply reservoir in the stator. An annular seal carrier is positioned within the channel such that opposite sides thereof are in sliding contact with sidewalls of the channel for inhibiting fluid escape around the carrier. Radially outer and inner circumferential slots are formed on the carrier with apertures through the carrier for coupling fluid between the slots. Outer circumferential grooves are formed around the carrier on opposite sides of the outer slot. Seal rings are positioned in the grooves in contact with the carrier and the rotor for preventing fluid escape along the carrier-rotor interface. Both the carrier and seals are provided with reduced land areas at contact points to facilitate radial and axial motion between rotor and stator without loss of seal integrity.

5 Claims, 3 Drawing Sheets

FLUID TRANSFER SEAL FOR TRANSFERRING FLUID ACROSS A ROTATING BOUNDARY

This application is a continuation-in-part of copending application Ser. No. 836,001 filed Mar. 4, 1986, now abandoned.

BACKGROUND OF THE INVENTION

This invention relates generally to apparatus for transferring fluid between differentially rotating components, and more particularly, to rotating boundary fluid transfer seals for use in rotatable assemblies.

There are many applications which require that a fluid be controllably transferred across an interface between differentially rotatable components, i.e., in apparatus having at least one component which is rotatable with respect to at least one other adjacent component. Many of these applications involve fluid transfer between a stationary member to a rotating member. If the rotation is limited and cyclic such transfer can occur by use of flexible hoses which can wind and unwind as necessary. Alternatively, if the differential rotation is slow a rubbing transfer seal can be positioned firmly against the rotating surface to effectively maintain a sealing relationship, although wear and subsequent leakage are common problems with this type of arrangement. If, however, the rotational speed between the components is relatively high, friction will cause the rubbing transfer seals to quickly erode, rendering them generally ineffective and impractical for high speed applications.

One application which requires controllable fluid transfer between high speed differentially rotating components is in gas turbine engines of the type used in present day aircraft. For example, this may occur in a hydraulic system which extends through rotating engine components. By way of explanation, gas turbine engines generally include a gas generator which comprises a compressor for compressing air flowing aft through the engine, a combustor in which fuel is mixed with the compressed air and ignited to form a high energy gas stream, and a turbine driven by the gas stream and connected for driving a rotor which in turn drives the compressor. Many engines further include a second turbine, known as a power turbine, located aft of the gas generator and which extracts energy from the gas flow to drive a rotating load with variable pitch blades such as found in the propulsor of helicopters, ducted turbo fan engines, and turbo prop engines.

A recent improvement over the turbo-fan and turbo-prop engines is the unducted fan engine such as disclosed in U.S. patent application Ser. No. 71,594 filed July 10, 1987 which is a continuation of Ser. No. 728,466, filed May 1, 1985, now abandoned. In the unducted fan engine, the power turbine includes a pair of counter rotating rotors concentrically disposed about a stationary stator. Turbine blades associated with each rotor drive counter rotating unducted fan blades or propellers which extend radially outward from the rotors. In order to achieve optimum performance these propellers are hydraulically controllable variable pitch blades.

U.S. patent application Ser. No. 797,346 filed Nov. 12, 1985 entitled Propeller/Fan Pitch Feathering Apparatus, discloses a hydraulic actuating device locatable in each rotor of the unducted fan engine for varying the propeller blade pitch. To operate the device, hydraulic fluid must be transferred or pumped under pressure from a reservoir to a plurality of blade actuators which rotate with the rotor. Either an arrangement for transferring the fluid from a stationary reservoir to the rotor must be provided or the reservoir and associated pressurizing equipment must rotate with the rotor. However, rotation of the reservoir and equipment would substantially alter the inertial characteristics of the turbine in an undesirable manner.

It is an object of the present invention to provide a fluid transfer seal for transferring pressurized fluid between assemblies which are rotatable with respect to one another.

It is an object of the present invention to provide an apparatus for transferring fluid from a stationary member to a rotating member in a gas turbine engine.

It is another object of the present invention to provide a fluid transfer seal for transferring fluid between differentially rotating members with minimum seal wear.

SUMMARY OF THE INVENTION

The present invention is directed to a fluid transfer seal for transferring pressurized fluid across an interface between differentially rotatable components. In an exemplary context, the invention is applied to a gas turbine engine having a rotor coaxially disposed about a stationary stator for rotation about a central axis. A first fluid passageway in the stator provides fluid communication to a boundary region between the stator and rotor. A second fluid passageway in the rotor is positioned to receive fluid from the boundary region. The engine stator includes an annular channel between facing surfaces of the rotor and the stator, which channel defines the boundary region between the stationary stator and the rotating rotor. Recessed circumferential channels are formed in the stator surface. An annular seal carrier is contained within each recessed channel, being coaxial therewith and having at least one aperture through the carrier to permit flow of hydraulic fluid between corresponding passageways in the stator and rotor. A pair of annular seals are positioned in circumferential grooves or slots of the carrier adjacent the rotor. The seals are disposed axially on opposing sides of the rotor fluid passageway. Frictional forces between the seals and rotor and between the annular carrier and the seals cause the carrier to rotate with the rotor. First and second sliding interfaces between the annular carrier and radial walls of the stator provide the only normal points of contact between the rotating carrier and the stator. The carrier has an edge-to-edge dimension such that spacing between the carrier and adjacent radial walls of the channel is such as to limit fluid flow through the interfaces to a predetermined minimum. The two sliding interfaces define a second region between the carrier and the stator for fluid flow from the stator passageway through the carrier aperture to the rotor passageway. The carrier includes undercut areas which limit the extent of the sliding interfaces and provide for entry of high-pressure fluid between the carrier and the channel. The fluid pressure in the undercut areas acts to automatically center the carrier thereby minimizing frictional forces at the interfaces and fluid seepage through the interfaces.

BRIEF DESCRIPTION OF THE DRAWINGS

The foregoing and other features, objects and advantages of the invention will become more apparent by reference to the accompanying drawing and the following detailed description taken in conjunction with the drawings in which.

DETAILED DESCRIPTION OF THE INVENTION

Figure 1:
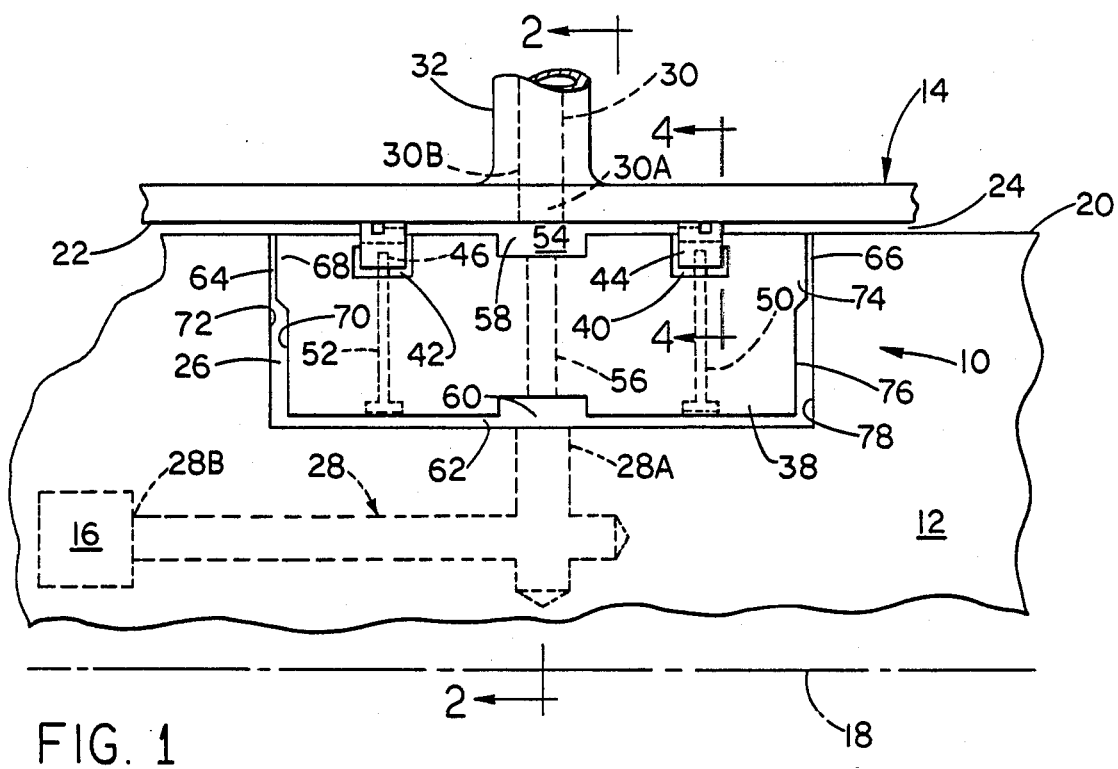
FIG. 1 is a section view parallel to an axis of rotation illustrating a fluid transfer seal in accordance with the present invention.
Figure 2:
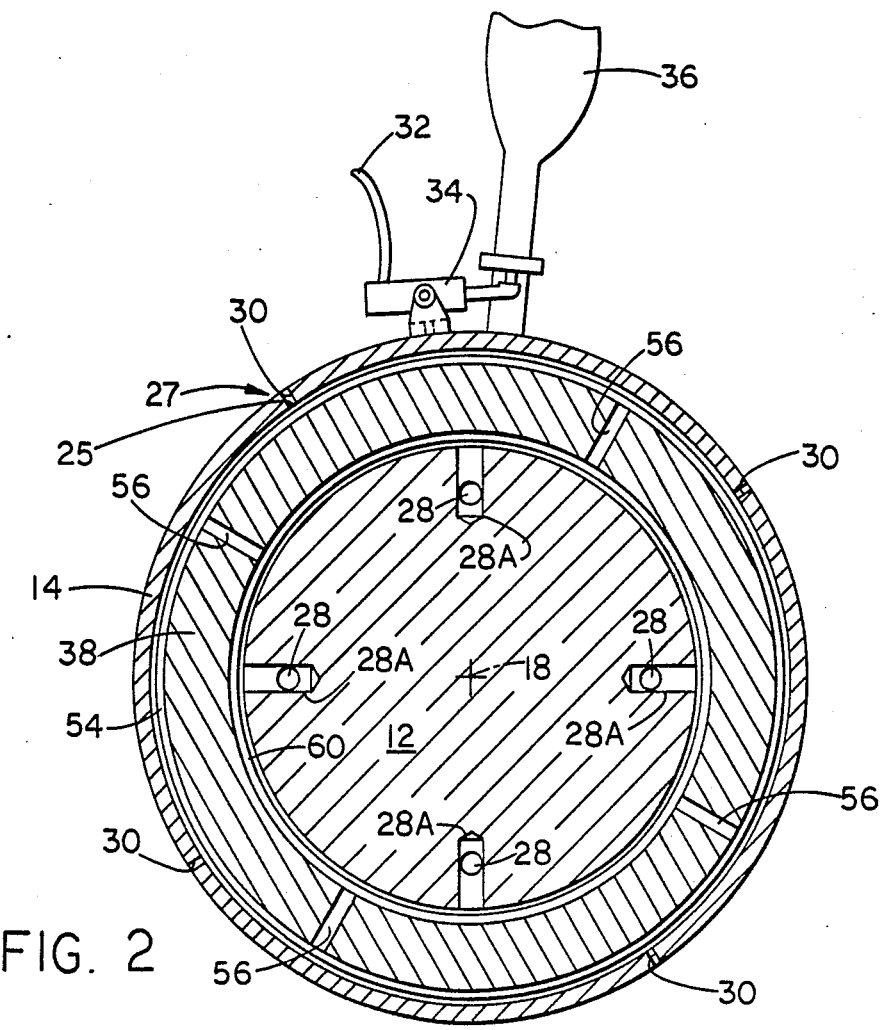
FIG. 2 is a radial section view of a rotor and stator illustrating the fluid transfer seal of FIG. 1.

A fluid transfer seal 10 of the present invention is shown in FIGS. 1 and 2 as it would be applied to provide for fluid transfer between a stationary member and a rotating member within a high-speed gas turbine engine. Such engines employ a stationary or non-rotating stator 12 and an outer rotating member or rotor 14. The seal 10 is adapted for bi-directional transfer of high-pressure fluid from a stationary, pressurized fluid reservoir 16 to equipment rotating with the rotor 14. In the embodiment shown, the rotor 14 rotates about an axis 18 through stator 12. The stator 12 has an outer surface 20 which faces an inner surface 22 of rotor 14, creating an annular channel 24 between the stator and rotor, the annular channel 24 defining a boundary region between the stationary stator and rotating rotor. Within the surface of stator 12 there is formed at least one recessed circumferential channel 26. A fluid passageway 28 is provided within the stator 12 and has a first end 28A communicating with channel 26 and a second end 28B coupled to the fluid reservoir 16. The rotor 14 is provided with a fluid passageway 30 having a first end 30A opening into channel 24 at a location facing channel 26. An end 30B of passageway 30 is coupled to a fluid tube 32 for passing fluid to and from hydraulic equipment in the rotor area.

Figure 4:
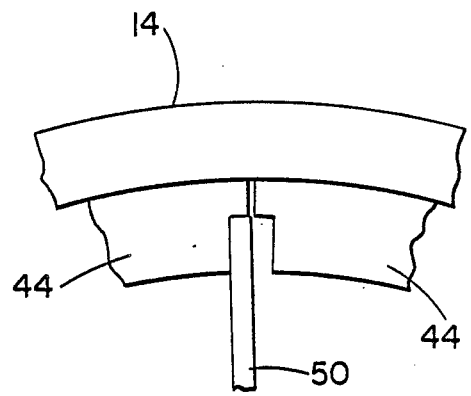
FIG. 4 is a partial axial view of the seal ring shown in FIG. 3 illustrating an end gap with clutching pin.

Hydraulic fluid may be transported from the fluid reservoir 16 through the fluid passageway 28 and the recessed channel 26 to the fluid passageway 30 and back again in order to operate a fluid actuator 34 mounted on the rotatable rotor 14 for varying the pitch of a propeller blade 36. In order to direct fluid flow through channel 26, the fluid transfer seal 10 comprises an annular seal carrier 38 positioned within channel 26. The annular carrier 38 includes first and second axially spaced circumferential grooves or slots 40 and 42, each positioned on opposite sides of passageway end 30A. First and second seal rings 44 and 46 are contained within respective ones of the first and second circumferential grooves 40 and 42 along outer surface 48 of seal carrier 38. The seal rings 44 and 46 exert a radial outward force against the rotor 14 and provide a sealing interface between the rings and the inner surface 22 of the rotor 14. Friction between rings 44, 46 and rotor surface 22 tends to cause the rings to rotate with rotor 14 rather than to slip or slide over surface 22. The sealing rings are preferably a hardened steel while the seal carrier 38 may be formed with a softer overlay, such as bronze. As will become apparent, the seal carrier surfaces are designed to operate with an oil film thus establishing a relatively low friction interface at selected surfaces such that rotation of carrier 38 is advantageous as compared to a sliding or frictional interface of rings 44, 46. To prevent rotation of rings 44, 46 with respect to carrier 38, pins 50 and 52 may be used to lock corresponding rings 44 and 46 to the carrier 38. Consequently, the carrier 38 will rotate with the rotor 14. As shown in FIG. 4, pins 50, 52 fit into an end gap formed in the rings and impart a circumferential force to cause the ring to rotate with the seal carrier. The ring thus acts as a clutch to retard relative motion between the ring and surface 22.

The annular seal rings 44 and 46 define a first fluid boundary region 54 between the carrier 38 and the rotor 14. The boundary region 54 is in fluid communication with the fluid passageway 30 and, by means of apertures 56 circumferentially spaced about and passing through carrier 38, with fluid passageway 28. The apertures 56 couple an outer circumferential slot 58 to an inner circumferential slot 60. The slots 58, 60 serve as reservoirs for distributing fluid to and from passageways 28 and 30 without alignment of apertures 56. The slot 60 is within an inner boundary region 62 between stator 12 and carrier 38.

The stator 12 and the carrier 38 are in sliding contact only at relatively narrow first and second sliding interfaces 64 and 66. The first sliding interface 64 is defined between a first extended portion 68 of a side wall 70 of carrier 38 and an adjacent or facing portion of a side wall 72 of the channel 26. The second sliding interface 66 is defined between a second and opposite extended portion 74 of a side wall 76 of carrier 38 and its adjacent and facing side wall 78 of channel 26. The two sliding interfaces 64 and 66 define the axial extents of fluid boundary region 62 within the annular channel 26 and between the carrier 38 and the stator 12.

In operation, fluid flows to and from the fluid reservoir 16 through fluid passageway 28, into the distributing reservoir or slot 60, spreading into the fluid boundary region 62, through the apertures 56, into the distributing reservoir or slot 58, spreading into the fluid boundary region 54 and then into the fluid passageway 30. Thus, fluid is transferred from the stator 12 to the rotor 14 by way of the fluid transfer seal 10. Likewise, the fluid transfer seal 10 permits fluid to flow from the rotor 14 to the stator 12.

Figure 3:
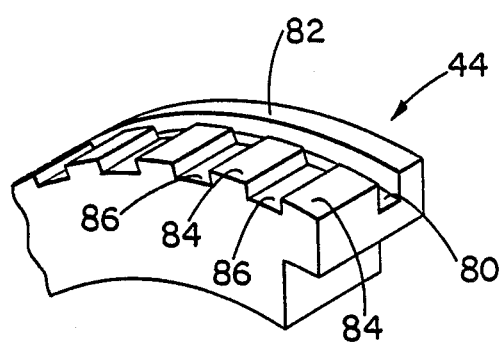
FIG. 3 is a perspective view of a portion of an annular seal ring.
Figure 5:
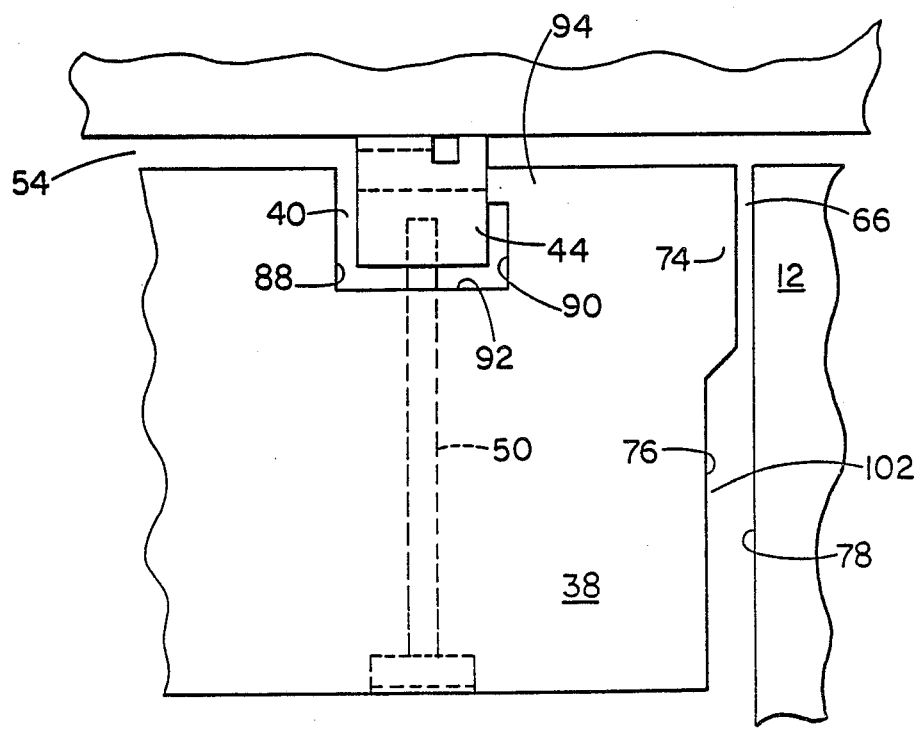
FIG. 5 is an enlarged view of a ring seal and sliding interface shown in FIG. 1.

Details of the inventive fluid transfer seal 10 may be seen by reference to FIGS. 3-5. The seal rings 44, 46 are essentially identical annular rings having an outer circumferential surface defined by a continuous sealing land 82 occupying a relatively narrow band and a plurality of land extensions or wear pads 84 circumferentially spaced by a corresponding plurality of axial slots 86. The slots 86 minimize the contact area between rings 44, 46 and rotor 14 while the wear pads 84 prevent cantilevering of the rings about the sealing land 82. The slots 86 are connected to an annular groove 80 formed circumferentially about the ring.

For purpose of description reference will be made to seal ring 44 with the understanding that ring 46 is similarly arranged. The ring 44 fits within groove 40 which groove is defined by opposing side walls 88 and 90 and bottom wall 92. The side wall 90 is partially undercut to form an annular sealing land 94 which abuts a side surface of seal ring 44. The ring 44 is forced toward land 94 by fluid pressure within the boundary region 54. Although the sealing ring forces created by the pressurized fluid would be greater without the slots 86 and the undercut in wall 90, the frictional forces between the seal ring 44 and the rotor 14 would also be greater. The slots 86 and the undercut wall reduce the force with which the ring is held against the mating surface whereby sliding of seal ring 44 either against surface land 94 or against surface 22 is less restricted. Sliding between ring 44 and land 94 is desirable in the radial direction for compensating for differential thermal expansion. Sliding against surface 22 is needed to compensate for axial motion of the stator with respect to the rotor. If, for example, a sudden lateral movement of the turbine engine were to cause the carrier 38 to shift axially with respect to the rotor 14, the seal between seal ring 44 and rotor 14 would not be lost.

The second seal ring 46 and its corresponding annular groove 42 are structed symmetrically opposite to the first seal ring 44 and its corresponding annular groove 40. In the preferred embodiment of the invention, the seal rings 44, 46 are metallic and similar in construction to piston rings of the type used in internal combustion engines. While elastomeric rings could be used, metallic components are chosen for the seal rings as well as the carrier 38 for structural strength and thermal capacity and to impose relatively low parasitic forces on fluid film layers between the metal components. For example, such fluid film layers will be formed by seepage of pressurized fluid into the narrow interfaces between each ring and a mating surface. While the narrow interfaces minimize fluid seepage out of the high pressure regions 54, 62, the film layers serve as lubricants to reduce friction at the interfaces.

The annular seal carrier 38 operates in conjunction with seal rings 44, 46 to provide a high speed, rotating fluid transfer seal. The carrier, as shown in FIGS. 1 and 5, includes end or side walls (from an axial reference) 70, 76 on opposite ends which are uniquely designed to facilitate automatic centering of carrier 38 with respect to channel 26. Since each end is a mirror image of the other, reference is made only to end wall 76 of FIG. 5. The wall 76 has an undercut portion 102 and an extending portion or land 74. The land 74 provides the sealing interface between carrier 38 and stator 12. The size of the land 74 is relatively small (radially narrow) to allow radial misalignment or shifting between rotor and stator without affecting the axial and radial balance of rings 44, 46 pressure and friction forces. As pointed out above, the reduction of pressure derived forces allows for radial shifting.

If the carrier 38 is shifted laterally due to sudden movement or thermal growth of the turbine engine, displacement at one interface will allow fluid seepage resulting in a fluid pressure drop along the corresponding side wall. At the same time, the constant or increased pressure between the carrier 38 and the opposite side wall of channel 26 creates a pressure differential across the carrier which tends to force the carrier 38 to become centered within the annular channel 26 and achieve a lateral force balance. The self-centering feature of the present invention reduces the possibility of the carrier 38 binding against the stator 12 at the sidewall interfaces.

Figure 6:
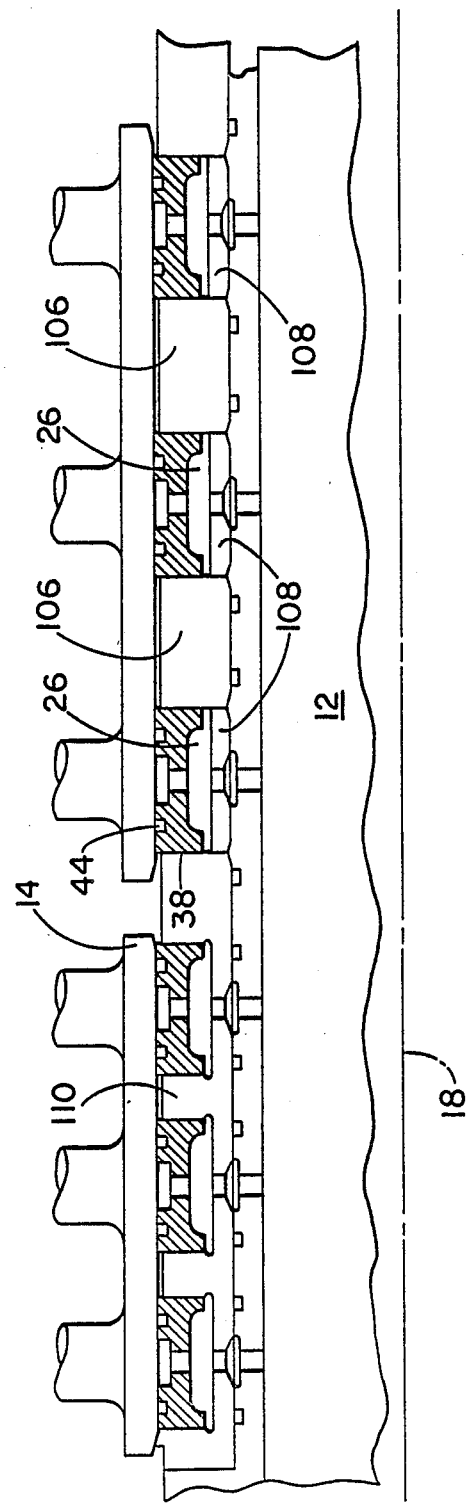
FIG. 6 illustrates a section view parallel to an axis of rotation of a rotor and a stator having a plurality of fluid transfer seals in accordance with the present invention.

Turning now to FIG. 6, there is shown an arrangement for coupling a plurality of independent fluid transfer lines through a differentially rotating interface. In one form, the fluid transfer seals 10 of the present invention are interspersed along the stator 12 by alternating annular spacers 106. Other annular spacers 108 are positioned between spacers 106. The spacers 106 and 108 together define a plurality of channels 26 for receiving seals 10. In another form, a wider annular spacer 110 is provided having a multiple number of channels 26 formed therein for receiving plural seals 10. In each embodiment, the spacers 108 and 110 are provided with appertures positioned to mate with passageways 28 in stator 12. Furthermore, there are provided seals 112, such as elastomeric O-rings, between the spacers and stator 12 to prevent fluid leakage. The seals 112 are common types of seals since the spacer-stator interface is a non-rotating interface.

While the principles of the present invention have now been made clear in an illustrative embodiment, there will become obvious to those skilled in the art, many modifications in structure, arrangements, portions and components used in the practice of the invention and otherwise which are particularly adapted for specific environments and operating requirements without departing from the spirit and scope of the invention as defined by the claims which follow.

What is claimed is:

1. A fluid transfer system for a gas turbine engine, the engine having a stator and a coaxial rotor positioned for rotation about at least a portion of an axial extent of the stator, the fluid transfer system comprising:
    at least one annular channel formed about a circumference of the axial extent of the stator adjacent the rotor;
    means coupled to the stator for supplying pressurized fluid to said channel;
    an annular seal carrier disposed within said channel, said carrier having an outer circumferential slot facing the rotor and an inner circumferential slot facing the stator and a plurality of spaced apertures extending through said carrier from said inner slot to said outer slot, an annular land formed on each axially opposite side edges of said carrier, each land facing a corresponding radial wall of said channel, said carrier having an edge-to-edge dimension such that spacing between each land and its adjacent channel radial wall is such as to restrict fluid flow past each land to a predetermined minimum rate;
    first and second outer circumferential grooves formed about said carrier on opposing sides of said outer circumferential slot;
    first and second annular sealing rings, each of said rings being positioned in a corresponding one of said grooves;
    means for coupling fluid from said outer circumferential slot to each of said grooves, the fluid pushing each ring into sealing relationship with a side of its corresponding groove and into sealing relationship with the rotor for containing fluid within boundaries defined by said rings; and
    means in the rotor adjacent said carrier for receiving fluid from said outer circumferential slot.

2. The fluid transfer seal of claim 1 and including means for locking each of said seal rings to said carrier in a manner to prevent only axial rotation of said seal rings with respect to said carrier.

3. The fluid transfer seal of claim 2 and including undercut portions defined along said side edges of said carrier radially inward of said lands, said undercut portions being in fluid communication with said inner circumferential slot for providing automatic centering of said carrier in said channel in response to a difference in fluid pressure between said side edges resulting from increased fluid leakage at one of said lands.

4. The fluid transfer seal of claim 3 wherein each of said seal rings includes a reduced contact area between each of the rings and a corresponding groove wall whereby a cutaway portion exists between said ring and wall, said cutaway portion being in fluid communication with said outer slot for reducing a net axial fluid force retaining each of said rings against a corresponding groove wall.

5. The fluid transfer seal of claim 4 wherein each of said seal rings includes a reduced outer contact area adjacent the rotor, said reduced outer contact area being formed by a plurality of circumferentially spaced axial slots extending partially across a radially outer face of each of said rings.

* * * * *